United States Patent [19]

Doucette, Jr. et al.

[11] Patent Number: 5,985,405
[45] Date of Patent: Nov. 16, 1999

[54] THREE DIMENSIONALLY REINFORCED ABLATIVE/INSULATIVE COMPOSITE

[75] Inventors: Jean J. Doucette, Jr., Boxford; Anthony R. Franchitto, Natick, both of Mass.

[73] Assignee: Textron Systems Corporation, Wilmington, Mass.

[21] Appl. No.: 09/083,223

[22] Filed: May 22, 1998

Related U.S. Application Data

[63] Continuation-in-part of application No. PCT/US97/01763, Jan. 30, 1997, which is a continuation-in-part of application No. 08/594,270, Jan. 30, 1996, abandoned.

[51] Int. Cl.$^6$ ...................................................... B32B 3/02
[52] U.S. Cl. ................................. 428/86; 428/87; 428/92; 428/96; 428/97; 428/102; 428/309.9; 428/313.3; 428/317.9; 442/226
[58] Field of Search ................................. 428/86, 87, 92, 428/95, 96, 97, 102, 309.9, 313.3, 313.7, 313.9, 317.9; 442/226

[56] References Cited

U.S. PATENT DOCUMENTS

| | | | |
|---|---|---|---|
| 3,915,777 | 10/1975 | Kaplan | 156/202 |
| 3,951,718 | 4/1976 | Gonzalez | 156/79 |
| 3,960,626 | 6/1976 | Casadevall | 156/93 |
| 4,063,684 | 12/1977 | O'Brien et al. | 239/265.11 |
| 4,567,076 | 1/1986 | Therrien | 428/102 |
| 4,655,866 | 4/1987 | Ferrier | 156/192 |
| 4,690,851 | 9/1987 | Auduc et al. | 428/116 |
| 4,835,046 | 5/1989 | Auduc et al. | 428/288 |
| 4,936,064 | 6/1990 | Gibb | 52/232 |
| 5,080,306 | 1/1992 | Porter et al. | 244/158 A |
| 5,310,592 | 5/1994 | Baker et al. | 428/117 |
| 5,433,991 | 7/1995 | Boyd, Jr. et al. | 428/193 |

FOREIGN PATENT DOCUMENTS

| | | |
|---|---|---|
| 2 625 793 | 7/1989 | France . |
| 2 628 507 | 9/1989 | France . |
| 31 15786 A1 | 11/1982 | Germany . |
| 2 097 433 | 11/1982 | United Kingdom . |
| 2 191 115 | 12/1987 | United Kingdom . |
| WO 97/28399 | 7/1997 | WIPO ............ F16L 59/02 |

*Primary Examiner*—Christopher Raimund
*Attorney, Agent, or Firm*—Hamilton, Brook, Smith & Reynolds, P.C.

[57] ABSTRACT

The present invention relates to a three-dimensionally reinforced ablative/insulative composite that includes a high density fabric-based ablative layer and a low density resin-based insulative layer that is chemically bound to the ablative layer. This composite further includes stitches of a temperature-resistant thread which extend through the ablative layer and form reinforcing loops within the insulative layer. These loops are preferably chemically and mechanically bound to the insulative layer.

23 Claims, 1 Drawing Sheet

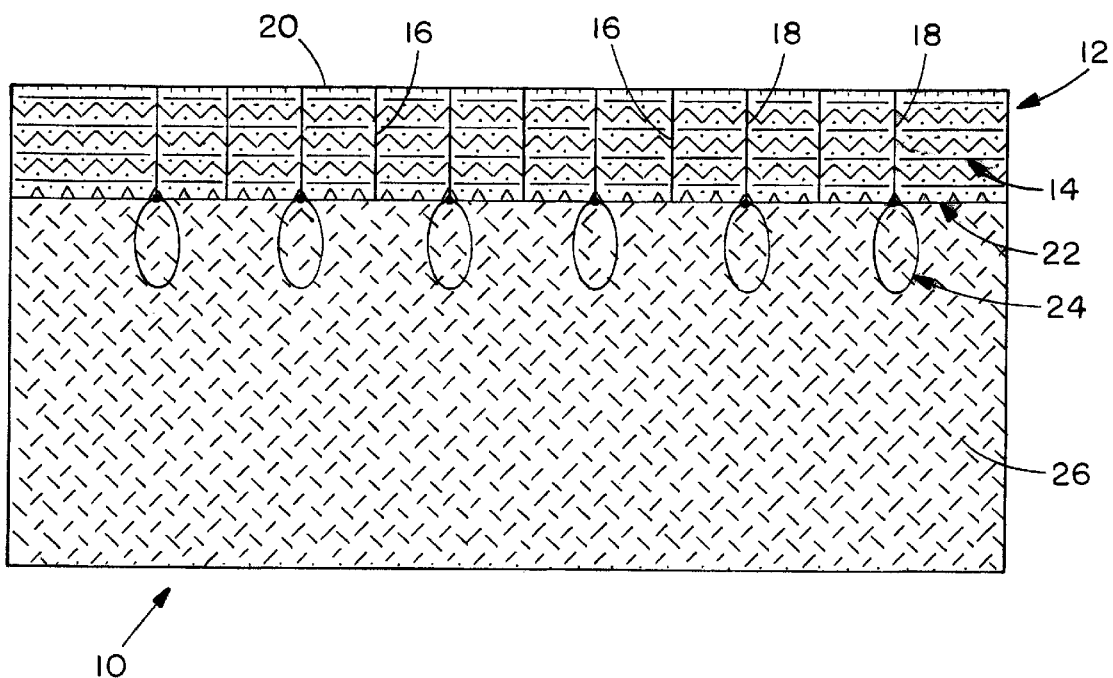

THREE DIMENSIONALLY REINFORCED ABLATIVE/INSULATIVE COMPOSITE

RELATED APPLICATIONS

This application is a Continuation-in-part of International Application No. PCT/US97/01763, filed Jan. 30, 1997, now WO 97/28399, which is a Continuation-in-Part of U.S. patent application Ser. No. 08/594,270, filed Jan. 30, 1996, now abandoned. The teachings of PCT/US97/01763 and U.S. Ser. No. 08/594,270 are incorporated herein, in their entirety, by reference.

BACKGROUND OF THE INVENTION

High performance re-entry vehicles and interceptor missiles will experience heating under conditions that challenge the ablation and/or insulation capabilities of conventional thermal protection materials applied thereto. These conditions include short-term exposure of the thermal protection materials, during ballistic ascent or re-entry through the atmosphere, to very high temperatures which will ablate any known material. These conditions also include long-term exposure to relatively lower heat flux levels, while gliding in the atmosphere, which can produce elevated temperatures deep inside the thermal protection material, thereby diminishing its insulative properties.

Typically, thermal protection materials employed for high performance ballistic re-entry (e.g., tape wrapped carbon phenolic and silica phenolic fabric composites) perform well under ablation but have insulation capabilities that are not sufficient to protect against overheating after long periods of thermal soak unless an excessive mass of insulating material is utilized.

Previously, the insulation capability of high density composite fabric ablative layers has been improved by superimposing and bonding a plurality of such layers by use of adhesives, stitching, and/or reinforcing elements or fasteners. However, the weight of high density ablative outer layers, needed to provide sufficient insulation, has typically been excessive, thereby resulting in reduced mission range and/or payload to accommodate this added weight.

Alternately, low density, lightweight resin foam or honeycomb have been used as an inner insulating layer, which is laminated to an outer composite fabric heat shield layer, by resin bonding, to provide suitable ablative and insulative protection at lower weights. However, many of these laminates have experienced delamination under adverse thermal conditions as could be experienced during the flight profile.

Therefore, a need exists for an ablative/insulative composite, having sufficient thermal protection capabilities, wherein the composite is lighter weight and will not fail (e.g., delaminate) during use.

SUMMARY OF THE INVENTION

The present invention relates to a three-dimensionally reinforced ablative/insulative composite that includes a high density fabric-based ablative layer and a low density resin-based insulative layer that is chemically bound to the ablative layer. This composite further includes stitches of a temperature-resistant thread which extend through the ablative layer and form reinforcing loops within the insulative layer. These loops are preferably chemically and mechanically bound to the insulative layer.

This invention has the advantage that it is a lightweight material which is suitable for use as a heat shield against ablative heating during ballistic flight and thermal soak heating during non-ballistic flight. This invention also has the advantage that bond, between the ablative layer and the insulative layer, has been multi-directionally reinforced to reduce the likelihood of separation of the layers.

BRIEF DESCRIPTION OF THE DRAWING

FIG. 1 is a view of a section of one embodiment of the 3-D reinforced ablative/insulative composite of the present invention, particularly illustrating the stitched reinforcement loops, of thermally-resistant thread, that reinforce the binding of the ablative layer to the insulating layer.

DETAILED DESCRIPTION

In FIG. 1 the 3-D reinforced ablative/insulative composite 10 comprises a fabric-based ablative layer 12. A fabric-based ablative layer, as defined herein, comprises one or more layers of a fabric, or fabrics, having a material-dependent ablation resistance (dependent upon the heat of vaporization of the material and the material density) and a total thickness that will typically prevent significant thermal damage to a vehicle or missile due to ablation during ballistic (e.g., missile ascent or vehicle re-entry) or non-ballistic (e.g., gliding) passage through the atmosphere. The ablation resistance of ablative layer 12 is measured in terms of thickness loss or weight loss from ablative layer 12. Preferably, ablative layer 12 will be entirely consumed during ballistic ascent or re-entry without damage to the base structure (e.g. vehicle or missile). Examples of fabrics, having a heat of vaporization suitable for the present invention, include carbon fabrics and silicon-containing fabrics.

The fabric can be woven, knit or non-woven. Preferably, the fabric will have a higher fiber density, and thus a higher material density, such as occurs in a woven fabric. More preferably, the fabric has a satin weave.

To further increase the material density, the fabric is impregnated, or contains at least one non-fiber, ablation-resistant material that is compatible with the fabric material. Examples of such materials include carbon or cured resins, for instance phenolic, silicone, epoxy or polyimide.

For example, it is preferred that the carbon fabric be impregnated with cured phenolic resin, as is described in Example 1, and that silicon-containing fabric be impregnated with cured silicone resin.

In more preferred embodiment, wherein ablative layer 12 contains a carbon fabric preform, the preform further contains amorphous and/or graphite carbon that was deposited therein, on the fabric fibers and/or in the fabric pores) by carbon deposition and densification means known in the art. Examples of such means include the deposition of graphitic carbon by thermally breaking down a hydrocarbon within the preform to deposit graphite therein, using a gaseous or liquid hydrocarbon, such as by chemical vapor infiltration and deposition. Examples of suitable means of carbon densification in a carbon fabric preform are further described in U.S. Pat. No. 4,472,454 issued to Houdayer et al., U.S. Pat. No. 5,348,774 issued to Golecki et al., and U.S. Pat. No. 5,389,152 issued to Thurston et al.

Alternatively, the carbon fabric preform can be impregnated with a charrable resin (e.g., epoxy or phenolic resin) which is then charred to form amorphous and/or graphitic carbon within the preform.

Ablative layer 14 should have a high density, usually about 1.25 g/cc or higher, for carbon fabric-based ablative layers, preferably 1.35 g/cc or higher. For silicon-based ablative layers, the density of ablative layer 14 is usually about 1.5 g/cc or higher.

Typically, ablation resistance can be further improved by increasing the total fabric thickness within the ablative layer. However, increasing ablation resistance, by increasing total fabric thickness, must be balanced against the increased weight that would be added to the missile or vehicle. In a preferred embodiment, to increase the fabric thickness in the ablative layer, multiple layers of fabric 14 are bonded, laminated or otherwise fastened together to make a fabric stack or preform used in ablative layer 12. It is more preferred that fabric layers 14 be stitched together with a temperature-resistant thread 16 that will not significantly degrade when heated to the design temperature for the composite (i.e., to about 5000° F. for ballistic passage protection or to about 2000° F. for non-ballistic passage protection). Examples of suitable temperature resistant threads include carbon and silicon-based thread. Most preferably, fabric layers 14 are lock stitched as is described in Example 1.

Fabric layers 14 are stitched with a number of stitches per square inch of surface area sufficient to hold fabric layers 14 together and to provide pathways, along the stitch, for the escape of decomposition products that are generated upon exposure of ablative layer 12 to high temperatures, such as ablation temperatures. Otherwise, decomposition gas buildup between fabric layers 14 could result in spallation of the impregnated fabric composite. Typically, fabric layers 14 are lock stitched together with at least nine stitches per square inch of surface area and more preferably at least sixteen stitches per square inch. Most preferably, the stitches of thread 16 are uniformly spaced.

For suitable ablative protection under ballistic conditions, carbon fabric is preferred for the ablative layer as carbon fabric provides a very high degree of ablative protection per unit of fabric weight. The carbon fabric should have a carbon content that prevents significant thermal degradation of the fabric when exposed to ablative temperatures between about 4000° F. to 5000° F. Typically, the carbon content is about 90%, by weight, or more. More preferably, the carbon content is about 92%, by weight, or more.

Typically, the total fabric thickness of the carbon fabric, for ablative protection, is between about 0.01 inches and 1.0 inches. Preferably, the total thickness is about 0.05 inches or more. Most preferably, for ballistic ablative protection, the total fabric thickness is between about 0.3 inches and about 0.6 inches.

Further description of a carbon-fabric, ballistic composite is provided in Example 1.

For suitable thermal protection under non-ballistic thermal heat soak conditions, a silicon-containing fabric, such as quartz fabric, silicon nitride fabric, or silicon carbide fabric is preferred for the ablative layer material. Typically, the total fabric thickness of the silicon-containing fabric is between about 0.05 inches to about 1.0 inch thick, and preferably between about 0.25 inches and about 0.75 inches thick. Further description of a quartz fabric, non-ballistic composite is provided in Example 2.

The composite also comprises a plurality of stitches 18 of temperature-resistant thread which extend from outer surface 20 of ablative layer 12, through inner surface 22 of ablative layer 12, to form reinforcing loops 24 outside inner surface 22.

The purpose of reinforcing loops 24 is to provide a plurality of anchor points which are bound, chemically and/or mechanically, to resin-based insulative layer 26 thereby providing a three-dimensional reinforcement of the binding of ablative layer 12 to insulative layer 26.

Preferably, reinforcing loops 24 also contain a cured thermosetting resin that is compatible with and chemically bound to the cured resin contained in the insulative layer. The number of reinforcing loops 24 provided must be sufficient to generally prevent separation of ablative layer 12 from insulative layer 26 while under ballistic ablative conditions. This number is also dependent upon the length of reinforcing loop 24 disposed within insulative layer 24. Typically, the composite should contain at least nine stitches 18 and reinforcing loops 24 per square inch of surface area, wherein reinforcing loops 24 are at least 0.05 inches long. More preferably, the composite contains at least sixteen stitches 18 and reinforcing loops 24 per square inch. Also, it is preferred that reinforcing loops 24 are uniformly spaced within the composite.

For manned re-entry vehicles, it is more preferred that the length of reinforcing loops 24 be about 0.5 inches long, or more.

Selection of a thread suitable to form stitches 18 and reinforcing loops 24, is dependent upon the ability of the thread to form stitches without breaking. The ability to form stitches is a function of the bend radius of the thread, bend radius (R) being defined by the equation:

$$R = E \times D / 2\sigma$$

wherein E is the tensile modulus of the thread, D is the filament diameter and $\sigma$ is the filament tensile strength. To be used for stitching, it is preferred that the bend radius be about 0.005 inches or less.

In addition to having a suitable bend radius, the thread must also have a filament tensile strength sufficient to usually survive the stitching operation without breaking. Preferably, the filament tensile strength should be about 600 ksi or greater.

Carbon thread is the preferred thread for use in forming stitches 18 and reinforcing loops 24 when ablative layer 14 is carbon-fabric based. The carbon content of the thread must be sufficient to provide dimensional stability (i.e., prevent significant separation of ablative layer 12 and insulative layer 24) and maintain thread strength at ablative temperatures without material failure. Typically, the carbon content of the thread is about 85 wt. % or more while preferably, the carbon content is about 92 wt. % or more. One suitable embodiment of reinforcing loops 24 is discussed in Example 1.

Wherein ablative layer 14 is silicon-fabric based, a silicon-containing thread is preferred, such as silicon nitride, silicon carbide or quartz thread.

Composite 12 further comprises insulative layer 26, which is disposed against inner surface of ablative layer 14 and around reinforcing loops 24. Insulative layer 26 is mechanically and/or chemically bound to both ablative layer 14 and reinforcing loops 24. Preferably, insulative layer 26 is both mechanically and chemically bound to reinforcing loops 24, as described in the Example 1.

Insulative layer 26, as defined herein, is a resin-based thermal insulation, with a density that is low enough to provide, at low weight, a suitable degree of insulation to thereby insulate the vehicle during ablation and/or heat soak conditions, and also is high enough to have a strength that will usually prevent material failure of the insulator. Preferably, the density is between about 0.2 to 0.3 grams/cc.

The low density insulation employed may be of the type conventionally used as pre-formed insulating layers in the space field. Suitable resins include, for example, phenolics, silicones, polyurethanes and epoxies which preferably bond, when curing, with the adjacent ablative layer 12 and reinforcing loops 24 to provide stronger bonding between ablative layer 14 and insulative layer 26. Suitable amounts of resin-curing agents are included when required to cure the resin system.

In the embodiment wherein ablative layer 14 is formed from carbon fabric, the preferred resin for insulative layer 26 is a phenolic resin, and is more preferably a rubberized phenolic resin, as described in Example 1.

More preferably, insulative layer 26 also contains low density fillers, such as carbon microballoons, phenolic microballoons or glass microballoons, for reducing the density of the insulation while also improving the insulative capability of insulative layer 26.

Most preferably, insulative layer 26 further includes fibers, having high melting points, to improve the strength of the layer material, thus permitting he use of lower density insulation with improved insulation capability. Suitable fibers include, for example, carbon fibers, ceramic fibers and silica-based fibers as described in Example 1. Preferably, the length of the fiber is a couple inches or less.

Insulative layer 26 is a rigid layer which is molded or machined to conform to the shape of the surface of the space vehicle or missile to which it is to be bonded.

The invention will now be further, and specifically described by the following examples.

EXAMPLE 1

3-D Reinforced Ablative/Insulative Composite for Ballistic Heating Conditions

A 3-D reinforced ablative/insulative composite, that functions primarily as a heat shield during ballistic atmospheric re-entry profiles or to thermally protect interceptor missiles during ascent, was made from a carbon fabric ablative layer, an insulative layer of a fiber-reinforced phenolic syntactic foam, and carbon thread-based reinforcement.

The ablative layer was made from a carbon preform layer. To make the carbon preform layer, eight layers of 90% carbonized polyacrylonitrile (PAN) satin weave fabric (0.0093 inches thick with 19 threads per inch by 19 threads per inch; T300-3K fabric purchased from Amoco) were stacked and then stitched tightly together. The stitches used were lock stitches made with 3-ply 1320 denier carbon thread (tensile modulus of 43 million psi and tensile strength of greater than 700 ksi) as both top and bobbin (bottom) threads.

The carbon thread was formed from 92% carbonized PAN filaments (#43 carbon filament having a diameter of 4.5 microns, purchased from Courtaulds). The filaments were stretch broken and then spun into the 3-ply thread (can be spun by S.A. Schappe, St. Rembert, France).

The lock stitching was performed using a Singer Class 11 industrial sewing machine. Alternately, a singer Class 7 industrial sewing machine could also be used. The stitches were in rows (8 stitches per inch) spaced about 0.30 inches apart.

The carbon thread reinforcement was then inserted through the carbon preform layer. To add the reinforcement, the preform layer was placed upon a spacer layer and then the layers were lock stitched together, by a Singer Class 11 industrial sewing machine, again using the 3-ply 1320 denier carbon thread. These reinforcement lock stitches ran from the top of the preform layer, through the preform and spacer layers, and then interlocked with the bottom thread at the underside of the spacer layer. The stitches were made in rows (6 stitches per inch) which were parallel to and equidistantly spaced between the rows of lock stitches used to form the carbon fabric preform layer.

The spacer layer was made from 3 layers of $\frac{3}{16}$ inch thick low density polypropylene foam which was placed on top of a bottom layer of cardboard.

After inserting the reinforcement lock stitches, the cardboard part of the spacer layer was removed from the underside of the preform layer. Removing the cardboard also caused the bottom thread, of the reinforcement lock stitches, to be separated from these stitches, thus forming thread loops emerging from the bottom of the preform layer.

The loops were then made rigid by saturating the loops with a phenolic resin and subsequently partially curing the resin. Specifically, phenolic resin (SC1008, Borden Chemical) was applied (e.g., by brushing) to the ends of the loops to saturate the loops. The three polypropylene foam layers of the spacer layer were then removed from the preform layer and the loops were rigidized by heating in an air circulating oven at 250° F. for about 5 minutes to B-stage (partially cure) the phenolic resin, thereby forming reinforcement loops.

A fiber-reinforced, phenolic syntactic foam insulative layer was then formed, in place, around the reinforcement loops and against the underside of the preform layer. First, 211 grams of phenolic microballoons (No. 0930 purchased from Union Carbide) were dry mixed, using compressed air, with 35 grams of $\frac{1}{8}$ inch long chopped quartz fiber (JPS Glass Fabrics) to form a substantially homogeneous dry mixture. This dry mixture was then combined with 50 grams of 5% rubber-modified phenolic resin and 60 grams methanol was added, as a solvent, to make a workable phenolic mixture or wet blend.

The 5% rubber-modified phenolic resin was made by mixing suitable amounts of 1008 phenolic resin and rubber modified phenolic resin (Schenectady Chemicals Type HRJ-1387, acrylonitrile butadiene rubber). The rubber-modification made the insulative layer less friable and tougher.

The phenolic mixture was then trowelled onto the reinforcement loops and the preform layer surface to form an uncured phenolic layer. The uncured phenolic layer was subsequently cured in a vacuum bag, under about 14 psi vacuum, while being heated in an oven at about 350° F. for about 8 hours, thereby forming the fiber-reinforced, phenolic syntactic foam insulator layer. During the curing process, which is a condensation reaction for phenolic resin, the syntactic foam is consolidated to the inner surface of the carbon preform and around the carbon loops. Thus, the insulator layer becomes more dense, and level on its exposed surface, as reaction products, methanol and gas bubbles are removed from the phenolic layer, and from between the preform layer and the phenolic layer, by the vacuum being pulled.

After curing, the insulator layer was machined to a desired thickness.

Subsequently, the ablative layer was formed from the carbon preform layer by saturating the preform layer with a phenolic resin (SC1008), B-staging the resin and then by compression molding to further consolidate the fabric in the preform layer to form a high density ablative layer and to chemically bond the ablative layer to the insulator layer.

The compression molding was performed in a hydraulic press by placing a heated platen against the preform layer and a water-cooled platen, against the insulator and then by pressing the platens together in a press to approximately 200 psi to form a 3-D reinforced ablative/insulative composite. The water-cooled platen was cooled to minimize degradation of the insulative layer.

Analysis of the composite found that the ablative layer had a high density of about 1.37 grams/cc and a fiber volume of about 60%, while the density of the insulator layer was about 0.23 grams/cc.

An evaluation of the area of the composite containing the reinforcement loops, conducted by sectioning and microscopic examination, found that the loops were well embedded mechanically in the foam insulator and was also chemical bonded into the foam microstructure as the previously partially curved (B-Stage) resin in the loops had bonded to the resin in the phenolic layer at the loop/syntactic foam interface when the insulative layer was cured.

EXAMPLE 2

3-D Reinforced Ablative/Insulative Composite for Thermal Soak Conditions

A composite for use under long-term thermal soak conditions, such as experienced during atmospheric gliding, was fabricated by the method described in Example 1. However, the ablative layer was formed using 10 layers of quartz fabric (style No. 581, JPS glass Fabrics) which were lock stitched together using quartz sewing thread (continuous filament 300-⅔ thread from Quartz Products Inc.) this stitching, had stitching rows of 8 stitches per inch with the rows spaced 0.25 inches apart.

The stitching to form the reinforcement loops had the same stitch pattern. The loops were rigidized with a rigid silicone resin (glass resin type GR908F, Owens-Ill.).

The composition of the insulative foam layer was 60% silicon microballoons (Grace Syntactics), 7% ⅛ inch chopped quartz fiber and 33% RTV silicone elastomer.

Equivalents

Those skilled in the art will recognize, or be able to ascertain, using no more than routine experimentation, many equivalents to specific embodiments of the invention described specifically herein. Such equivalents are intended to be encompassed in the scope of the following claims.

The invention claimed is:

1. A three-dimensionally reinforced ablative/insulative composite, comprising:
   a) a high density fabric-based ablative layer, wherein the fabric of the fabric-based ablative layer includes ceramic fibers;
   b) a plurality of stitches of a ceramic thread, wherein said stitches extend through the ablative layer, and wherein said stitches form reinforcing loops outside an inner surface of the ablative layer; and
   c) a low density resin-based insulative layer, wherein said insulative layer is formed around said loops and is bound to the inner surface of the ablative layer.

2. A composite of claim 1 wherein the fabric-based ablative layer comprises
   a) multiple layers of fabric disposed in a stack;
   b) means for binding the fabric layers together to form a fabric preform; and
   c) a non-fiber ablative material disposed within the fabric preform.

3. A composite of claim 2 wherein the binding means comprises a plurality of lock stitches made with a second ceramic thread.

4. A composite of claim 2 wherein the fabric preform comprises multiple layers of carbon fabric.

5. A composite of claim 4 wherein the non-fiber ablative material, disposed in the preform, further comprises a cured carbon-containing resin.

6. A composite of claim 5 wherein the cured carbon-containing resin comprises a phenolic resin.

7. A composite of claim 4 wherein the non-fiber ablative material, disposed in the preform, is carbon.

8. A composite of claim 3 wherein the second ceramic thread is a carbon thread.

9. A composite of claim 1 wherein the ceramic thread is selected from the group consisting of carbon thread, quartz thread, silicon nitride thread and silicon carbide thread.

10. A three-dimensionally reinforced ablative/insulative composite, comprising:
    a) a high density fabric-based ablative layer;
    b) a plurality of stitches of a thread, wherein said stitches extend through the ablative layer, and wherein said stitches form reinforcing loops outside an inner surface of the ablative layer; and
    c) a low density resin-based insulative layer, wherein said insulative layer is formed around said loops and is bound to the inner surface of the ablative layer, and wherein the insulative layer comprises: a cured resin and microballoons.

11. A composite of claim 10 wherein the cured resin is selected from the group consisting of phenolic, rubberized phenolic, silicone, epoxy and polyimide resins.

12. A composite of claim 10 wherein the microballoons are selected from the group consisting of phenolic, carbon and glass microballoons.

13. A composite of claim 10, the insulative layer further comprising high temperature fibers.

14. A composite of claim 13 wherein the high temperature fiber is selected from the group consisting of carbon, ceramic and silica fibers.

15. A three-dimensionally reinforced ablative/insulative composite, for thermal protection from ablation, comprising:
    a) a high density ablative layer containing multiple layers of carbon fabric, wherein said fabric also contains a cured phenolic resin;
    b) a plurality of stitches of a carbon thread wherein said stitches extend through the ablative layer, and wherein said stitches form reinforcing loops outside an inner surface of the ablative layer; and
    c) a low density insulative layer of a syntactic rubberized phenolic foam, wherein said foam contains microballoons and high temperature fibers.

16. A three-dimensionally reinforced ablative/insulative composite, for thermal protection under heat soak conditions, comprising:
    a) a high density ablative layer containing multiple layers of quartz fabric, wherein said fabric also contains a cured silicone resin;
    b) a plurality of stitches of a quartz thread wherein said stitches extend through the ablative layer, and wherein said stitches form reinforcing loops outside an inner surface of the ablative layer; and
    c) a low density insulative layer of a syntactic silicone foam, wherein said foam contains microballoons and high temperature fibers.

17. An insulated substrate, comprising:
    a) a substrate;
    b) a resin-based insulative layer bonded to the substrate;
    c) a fabric-based ablative layer having an inner surface disposed against the resin-based insulative layer, wherein the resin-based insulative layer is positioned between the substrate and the fabric-based ablative layer; and
    d) a plurality of stitches of a temperature-resistant thread, wherein the stitches extend through the fabric-based ablative layer, and wherein the stitches form reinforcing loops extending into the resin-based insulative layer.

18. The insulated substrate of claim 17, wherein the substrate is a substructure of a space vehicle or missile.

19. The insulated substrate of claim 18, wherein the fabric-based ablative layer has a composition and a thickness that can prevent significant thermal damage to the space vehicle or missile due to ablation during passage through the atmosphere.

20. The insulated substrate of claim 17, wherein the fabric-based ablative layer comprises:
   a) multiple layers of fabric bound together to form a fabric preform; and
   b) a non-fiber ablative material disposed within the fabric preform.

21. The insulated substrate of claim 20, wherein the multiple layers of fabric are bound together with a plurality of lock stitches.

22. The insulated substrate of claim 17, wherein the reinforcing loops and the fabric-based ablative layer include ceramic fibers.

23. The insulated substrate of claim 17, wherein the resin-based insulative layer includes microballoons.

* * * * *